J. M. DODGE.
CHAIN LINK.
APPLICATION FILED JULY 3, 1913.
1,130,582.
Patented Mar. 2, 1915.
2 SHEETS—SHEET 1.
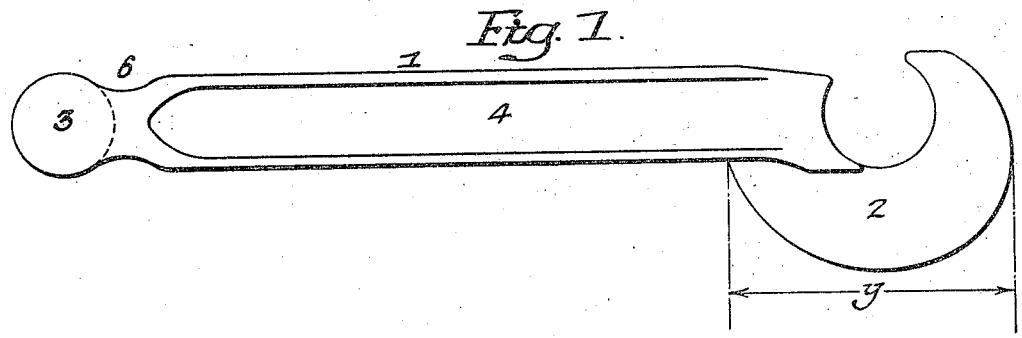
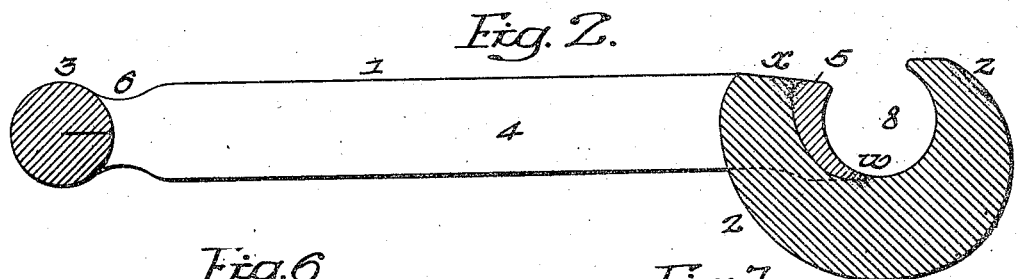
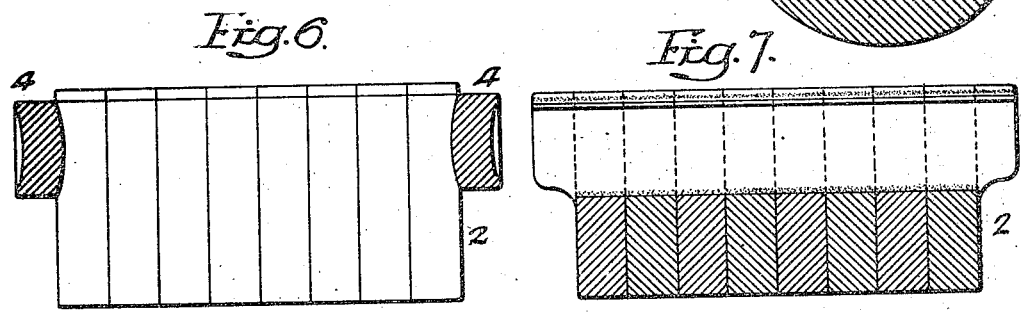
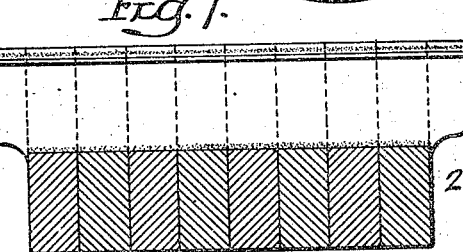
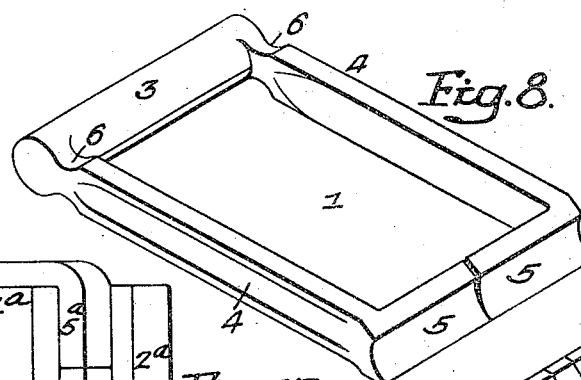
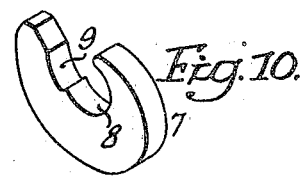
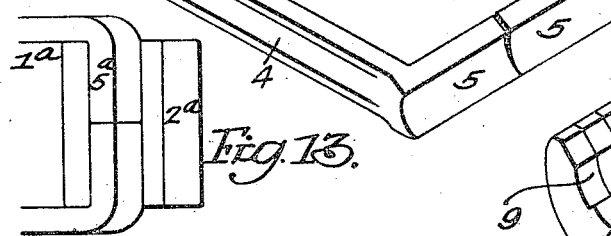
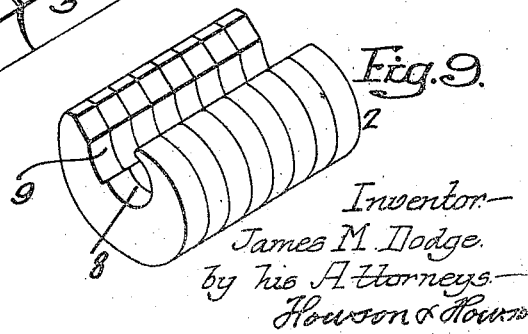
Witnesses—
Inventor—
James M. Dodge.
by his Attorneys—
Howson & Howson J. M. DODGE.
CHAIN LINK.
APPLICATION FILED JULY 8, 1913.
1,130,582.
Patented Mar. 2, 1915.
2 SHEETS—SHEET 2.
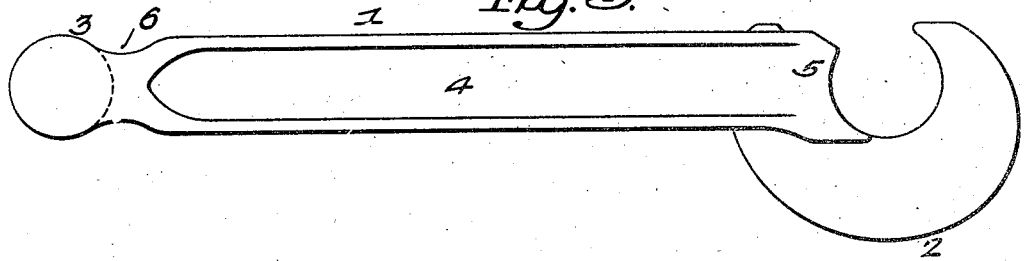
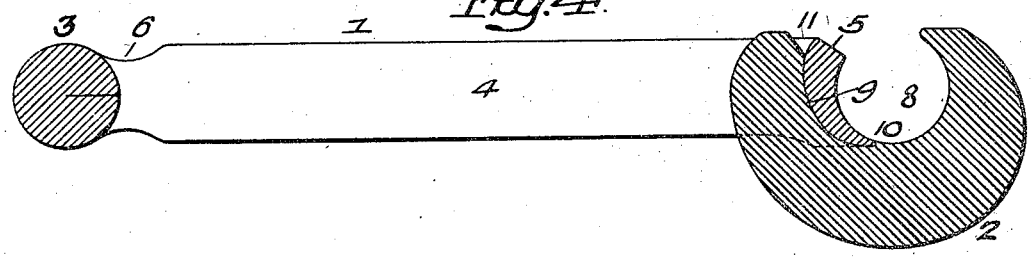
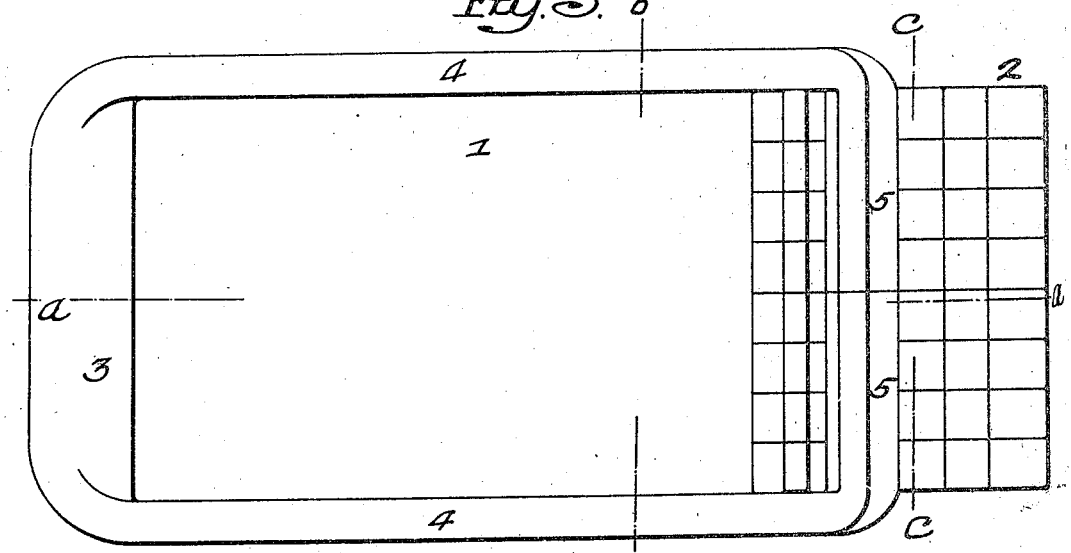
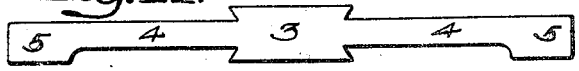
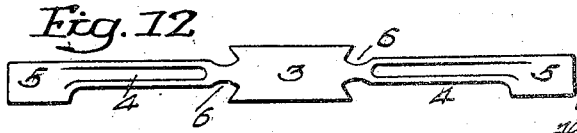
Witnesses—
Wilbt Burrows
Charles H. York
Inventor—
James M. Dodge.
by his Attorneys
Howson & Howson

UNITED STATES PATENT OFFICE.

JAMES M. DODGE, OF PHILADELPHIA, PENNSYLVANIA.

CHAIN-LINK.

1,130,582.

Specification of Letters Patent.

Patented Mar. 2, 1915.

Application filed July 8, 1913. Serial No. 777,912.

*To all whom it may concern:*

Be it known that I, JAMES M. DODGE, a citizen of the United States, residing in Philadelphia, Pennsylvania, have invented certain Improvements in Chain-Links, of which the following is a specification.

My invention relates to certain improvements in chain links, especially links used in drive chains, in which the body is rectangular in form with an opening for the reception of the teeth of a sprocket wheel and provided with a hook at one end by which it is coupled to an adjoining link.

One object of my invention is to reduce the cost of manufacture of a link of this type and to increase its strength.

A further object of the invention is to simplify the method of assembling the link and hook members and to form the side bars so that they will more readily adapt themselves to the sprocket teeth.

A still further object of the invention is to make a built up wrought metal link which will have the same outside dimensions as a standard malleable iron link of the same type, so that the links will interchange.

In the accompanying drawings: Figure 1, is a side view of a link made in accordance with my invention; Fig. 2, is a longitudinal sectional view; Fig. 3, is a side view illustrating the parts assembled prior to welding; Fig. 4, is a longitudinal sectional view of the assembled parts on the line $a$—$a$, Fig. 5; Fig. 5, is a plan view; Fig. 6, is a transverse sectional view on the line $b$—$b$, Fig. 5; Fig. 7 is a transverse sectional view on the line $c$—$c$, Fig. 5; Fig. 8 is a perspective view of the body portion of the link; Fig. 9, is a perspective view of the hook section with the members thereof assembled; Fig. 10, is a perspective view of one of the members of the hook section; Figs. 11 and 12, are views of the blank from which the body portion of the link is made; and Fig. 13, is a view of a modification of the invention illustrating a solid hook member.

Referring to the drawings, 1 is the body portion of the link, made rectangular in the present instance, and having an open center into which the teeth of a sprocket wheel can project. This body portion is made from a blank, illustrated in Figs. 11 and 12, bent into shape to form the end bar 3, side bars 4, and end members 5; the two end members, in the present instance, abutting within the hook section 2.

As illustrated in Fig. 11, the blank is enlarged at the center to form the end bar 3 and the edges are undercut for a purpose described hereinafter. The ends of the bar, which form the end members 5, are also increased in width by forming a lug on one side, and the portion forming the side bars is pressed so that, when the link member is formed, the inside of each side bar will be round and the outside will be recessed, forming upper and lower ribs, as shown in Fig. 8. This construction not only stiffens the side bars, but also provides a tapered opening for the sprocket teeth to enter the link. The portion forming the end bar 3 is bent over to form the round bars illustrated in Fig. 2, with the abutting portions on the inside of the link. This end bar is solid and, as the joint is at the inside, it will not materially weaken the end bar.

The blank is notched at 6 at each side of the end bar to form the reduced portions of the side bars to allow one link to be removed laterally from the one to which it is coupled. By making the ends of the central projections of the blank undercut, as shown in Figs. 11 and 12, the blank is more readily bent and the rounded end portion will extend from one inner wall of the link to the other, making a complete round end bar with an increased diameter which is even throughout.

The end members 5 are increased in width but not in thickness and are shaped, as shown in Figs. 4 and 8, so that the outside surface of each member will conform to the shape of the rear wall of the socket of the hook member 2. When the blank is bent into shape, as in Fig. 8, the side bars and end members are arranged on edge, making both the side bars and the end members comparatively narrow, yet of the same strength as a standard link made of malleable iron. By making the end members narrow, the hook member is not increased in diameter and, consequently, can be made of the same size and shape as the hook member of the ordinary malleable iron link with which it must interchange. The hook member 2, in the present instance, is made of a series of punched sections 7, Fig. 10, which are arranged side by side to form a hook of the desired width, as in Fig. 9. Each section has a recess 8 forming the socket for the cross bar 3 of an adjoining link and the rear wall of this recess is shaped to form a seat 9 for the end members 5 of the link section to which it is rigidly attached. The rear surface of each end member 5 is curved, as in Fig. 4, to conform to the seat 9, while the outer surface of each member 5 is shaped to form the rear wall of the socket of the completed link, which is substantially the same diameter as the end member 3. The end members 5 extend below the side members 4, as shown in Figs. 3 and 4, and are tapered and curved. The lower end of each end member 5 rests against a shoulder 10 in the present instance, insuring the proper assembling of the sections of the link.

When the parts are assembled, they are welded together at $x$, Fig. 2, preferably by means of an acetylene flame which is passed over the upper joint between the hook section and the end members of the link section, uniting all of the sections of the socket together, as well as making an integral connection between said members and the link section. A weld joint may be made at $z$, Fig. 2, to retain the individual members of the hook section together, as well as at $w$ within the socket. The parts can be welded at any point or points desired as found most expedient. I preferably bevel the hook elements at 11, so that the welding flame will make a deep weld, and the extra metal of the link section and hook section at each side of the recess formed by the bevel 11 fills the recess, as in Fig. 2, thus insuring a proper weld. After the parts have been assembled and secured by welding, the end members of the body portion form a continuation of the walls of the socket of the hook section, so that, when an end bar of an adjoining link is mounted in a socket, a neat fit is assured.

By the above construction, I am enabled to make a built up wrought metal link of the same dimensions as a standard malleable iron link which will interchange with said link. The distance between the rear and the forward end of the hook member, as indicated by the line $y$, Fig. 1, is the same as that of a standard malleable iron link and this is accomplished by making the end bar 5 comparatively thin and wide, allowing sufficient metal at the back of the hook member so that, when the parts are united by welding, they will withstand the strains to which the link is subjected. In some instances, the hook member may be made solid, as in Fig. 13, and in this case the hook member $2^a$ may be made from a drawn bar shaped in cross section as desired, and cut off in lengths. The end members $5^a$ of the body portion $1^a$ may be welded thereto, as above described. I have shown the two parts 5 of the body portion abutting in Fig. 8. They may be assembled in this manner and welded together when the body portion is secured to the hook section, or they may be welded together in advance of the welding of the two portions of the link.

Tests have been made which prove that a link made in accordance with my invention will stand greater strains than the ordinary standard malleable iron link of the same size. As the link is made by the use of punches and dies and the parts welded, the output can be materially increased over and above the present universal method of making the links, which is by first casting the links and then subjecting them to the process by which they are made malleable.

I claim:

1. The combination in a chain link, of a body portion made rectangular and having two end bars and two side members connecting the bars; and a hook section having a transverse socket shaped to receive one of the end bars of the link section, the parts being secured together to form a unitary structure, the end bar forming the rear wall of the socket for an adjoining link.

2. The combination of a link consisting of a rectangular body portion, two end bars and side members connecting the end bars; one of said end bars being rounded and the other being narrow and curved; and a hook section having a socket therein arranged to receive the narrow end bar of the body portion, the parts being secured together and said end bar forming the rear wall of the socket of the hook section.

3. The combination of a link consisting of a rectangular body portion having end bars and side members connecting the end bars; a series of hooked elements, each having a socket, said elements being arranged side by side to form a hook member, one end bar of the body portion being located in the socket and secured to the several elements and forming the rear wall of the socket of the hook section.

4. The combination in a link, of a body portion rectangular in form having two end bars and side members connecting the bars, one of the end bars being round in cross section and the other of a greater width than the end bars and curved in cross section; a hook member having a socket therein, the rear wall of the socket being shaped to conform to the end bar of the body portion, said parts being secured together, the end bar forming the rear wall of the socket of the completed link.

5. The combination in a body portion having two end bars and side members connecting the end bars, one of said end bars being rounded in cross section, the other being curved, the side members being curved in cross section forming upper and lower ribs on the outer surface; a hook section made of a series of elements spaced side by side, said hook section having a transverse socket therein of a size to receive the end bar of the body portion and the round end of the adjoining link, said first mentioned end bar being secured to the hook section.

6. The combination in a link, of a body portion having two end bars and side members connecting the end bars made from a blank bent into shape, one end bar being rounded, the side members and the other end bar being greater in height than in width, the last mentioned end bar being greater in depth than the side members and curved; a hook member having a socket, the rear wall of the socket being curved to conform to the shape of the end bar to which it is attached, while the outer surface of the end bar is curved to conform to the front wall of the socket so as to form a bearing for the end bar of an adjoining link, the two elements being secured together.

7. The combination in a link of a body portion having two end bars and side members connecting the end bars made from a blank bent, one end of the bar being round, the side members and the other end bar being greater in height than in width, the last mentioned end bar being greater in depth than the side members and curved; a hook member having a socket, the rear wall of the socket being curved to conform to the shape of the end bar to which it is attached, while the outer surface of the end bar is curved to conform to the front wall of the socket so as to form a bearing for the end bar of an adjoining link; and the two parts being secured together at the upper edge back of the socket and at the lower edge within the socket.

In testimony whereof, I have signed my name to this specification, in the presence of two subscribing witnesses.

JAMES M. DODGE.

Witnesses:
WM. E. SHUPE,
WM. A. BARR.